(12) United States Patent
Wigen

(10) Patent No.: US 11,273,606 B2
(45) Date of Patent: Mar. 15, 2022

(54) SWEEP GAS SYSTEMS

(71) Applicant: Scott Wigen, Eagan, MN (US)

(72) Inventor: Scott Wigen, Eagan, MN (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 164 days.

(21) Appl. No.: 16/517,026

(22) Filed: Jul. 19, 2019

(65) Prior Publication Data

US 2021/0016507 A1 Jan. 21, 2021

(51) Int. Cl.
| | |
|---|---|
| *B29C 64/35* | (2017.01) |
| *B33Y 30/00* | (2015.01) |
| *B33Y 40/00* | (2020.01) |
| *B33Y 50/02* | (2015.01) |
| *B29C 64/20* | (2017.01) |
| *B29C 64/393* | (2017.01) |

(52) U.S. Cl.
CPC .............. *B29C 64/35* (2017.08); *B29C 64/20* (2017.08); *B29C 64/393* (2017.08); *B33Y 30/00* (2014.12); *B33Y 40/00* (2014.12); *B33Y 50/02* (2014.12)

(58) Field of Classification Search
CPC ....... B29C 64/35; B29C 64/20; B29C 64/393; B29C 64/371; B22F 10/20; B22F 10/322; B22F 10/28; B22F 12/00; B22F 12/90; B22F 12/70; B22F 12/224; B22F 2999/00
See application file for complete search history.

(56) References Cited

U.S. PATENT DOCUMENTS

| | | | |
|---|---|---|---|
| 10,195,693 | B2 | 2/2019 | Buller et al. |
| 2018/0222116 | A1 | 8/2018 | Ng et al. |

FOREIGN PATENT DOCUMENTS

| | | | | |
|---|---|---|---|---|
| DE | 102013215377 A1 | 2/2015 | | |
| DE | 102017211657 A1 | 1/2019 | | |
| EP | 3050666 A1 | 8/2016 | | |
| EP | 3705273 A1 | * 9/2020 | ............. | B23K 26/03 |
| WO | 2014/0199150 | 12/2014 | | |
| WO | WO-2014199150 A1 | * 12/2014 | ............. | B22F 10/20 |
| WO | 2018215843 A2 | 11/2018 | | |

OTHER PUBLICATIONS

Extended European Search Report dated Mar. 30, 2020, issued during the prosecution of European Patent Application No. EP 19216288.1.

* cited by examiner

*Primary Examiner* — Joseph S Del Sole
*Assistant Examiner* — Jamel M Nelson
(74) *Attorney, Agent, or Firm* — Locke Lord LLP; Daniel J. Fiorello; Gabrielle L. Gelozin

(57) ABSTRACT

A sweep gas system for an additive manufacturing machine can include a gas manifold having an outlet configured to effuse gas into a build area of the additive manufacturing machine. The gas manifold can be moveable across at least a portion of the build area. The sweep gas system can include a controller configured to control a position of the gas manifold.

9 Claims, 3 Drawing Sheets

SWEEP GAS SYSTEMS

FIELD

This disclosure relates to sweep gas systems for additive manufacturing machines.

BACKGROUND

Laser powder bed additive manufacturing systems utilize inert gas flow to move the smoke, condensate, and other particulate (together often called condensate) out of the way of the laser path. An air knife is often employed very close to the powder bed to quickly move the spatter out of the optical path. When a gas flow air knife is used, the gas will effuse from the air knife manifold to move across the build plate to the opposite side where the gas and/or spatter is enters a removal manifold for filtration.

Lasers will typically scan from the farthest away from the air knife to closest to the air knife in order to keep condensate/particles from landing on an area that will be scanned. As gas flow is turned up to promote sufficient flow, powder can be blown away. As platforms get larger and larger, it is more difficult to maintain sufficient gas flow across the build volume. Attempting to provide flow from one side to the other often leads to turbulent, irregular, and unstable flow.

Such conventional methods and systems have generally been considered satisfactory for their intended purpose. However, there is still a need in the art for improved build area sweep gas systems. The present disclosure provides a solution for this need.

SUMMARY

A sweep gas system for an additive manufacturing machine can include a gas manifold having an outlet configured to effuse gas into a build area of the additive manufacturing machine. The gas manifold can be moveable across at least a portion of the build area. The sweep gas system can include a controller configured to control a position of the gas manifold.

The controller can be configured to position the outlet of the gas manifold relative to a laser spot position and/or a melt pool location a predetermined distance from the laser spot position and/or melt pool. The controller can be configured to maintain the predetermined distance from the laser spot position and/or melt pool as a laser scans over the build area such that the sweep gas manifold moves to follow the laser spot position and/or melt pool. In certain embodiments, the controller can be configured to determine the predetermined distance in real time as a function of a laser power, a scan speed, a melt pool size, and/or a sweep gas pressure.

The gas manifold can include a bellows connected to the outlet to allow the outlet to move relative to the build area while maintaining a sealed sweep gas path. The outlet can include a width at least as wide as a build area width of the build area.

In certain embodiments, the outlet can be angled and configured to effuse gas at a non-right angle relative to a plane defined by the build area. The angled outlet can be angled upward to effuse flow upward away from the build area.

In accordance with at least one aspect of this disclosure, a method of using a sweep gas system of an additive manufacturing machine can include moving a gas manifold, e.g., as described above, across at least a portion of a build area of an additive manufacturing machine. The method can include effusing gas from an outlet of the gas manifold into the build area. Moving the gas manifold can include positioning the outlet of the gas manifold relative to a laser spot position and/or a melt pool location a predetermined distance from the laser spot position and/or melt pool. Moving the gas manifold can include maintaining the predetermined distance from the laser spot position and/or melt pool as a laser scans over the build area to follow the laser spot position and/or melt pool.

The method can include determining the predetermined distance in real time as a function of a laser power, a scan speed, a melt pool size, and/or a sweep gas pressure. Moving the gas manifold can include extending and/or contracting a bellows connected to the outlet to allow the outlet to move relative to the build area while maintaining a sealed sweep gas path. The method can include effusing gas from the outlet at a non-right angle relative to a plane defined by the build area.

In accordance with at least one aspect of this disclosure, an additive manufacturing machine can include a build area, an energy applicator (e.g., a laser) configured to melt powder in the build area, and a sweep gas system as disclosed herein, e.g., as described above. Any other suitable components (e.g., a recoater) are contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
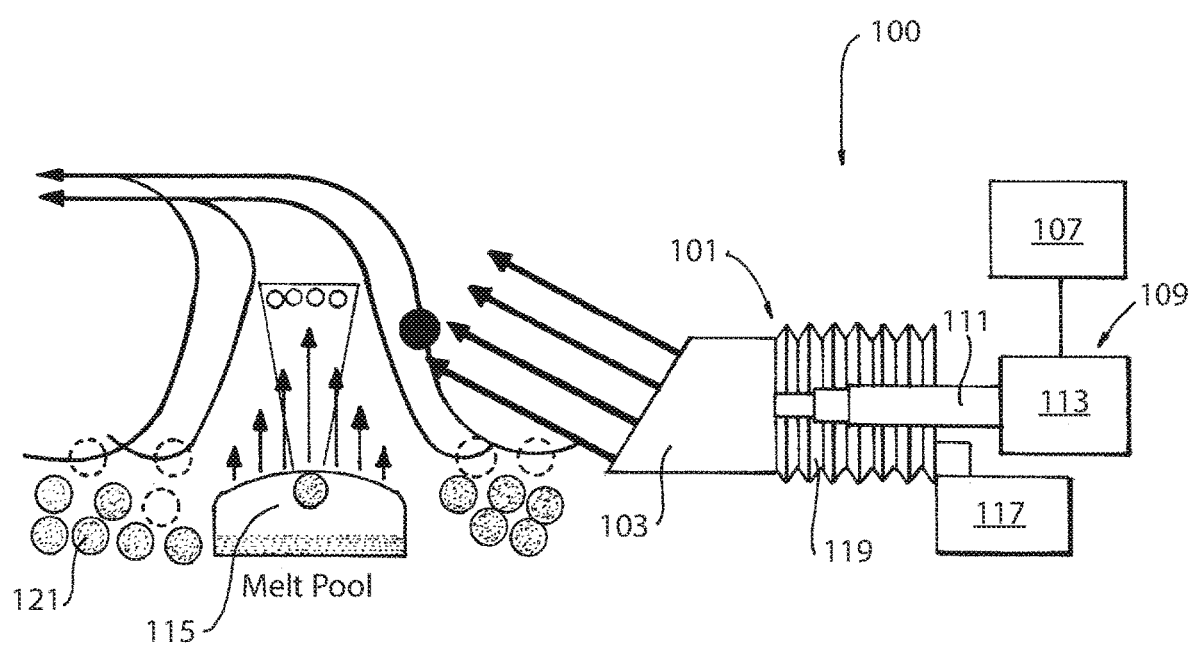
FIG. 1 is a schematic diagram of an embodiment of a sweep gas system in accordance with this disclosure.
Figure 2:
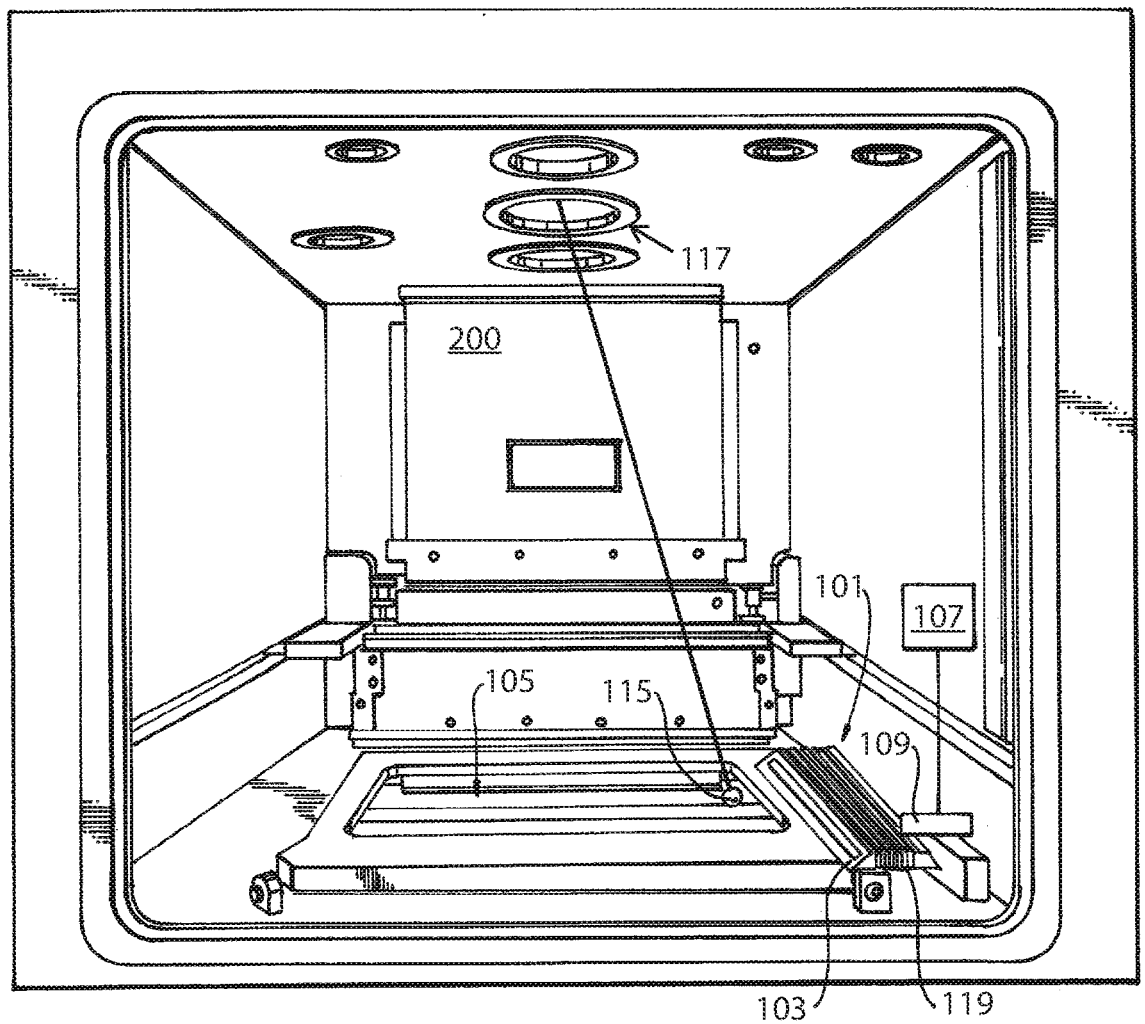
FIG. 2 is a perspective view of the sweep gas system of FIG. 1 disposed in an additive manufacturing machine in accordance with this disclosure, shown the gas manifold in the retracted state.
Figure 3:
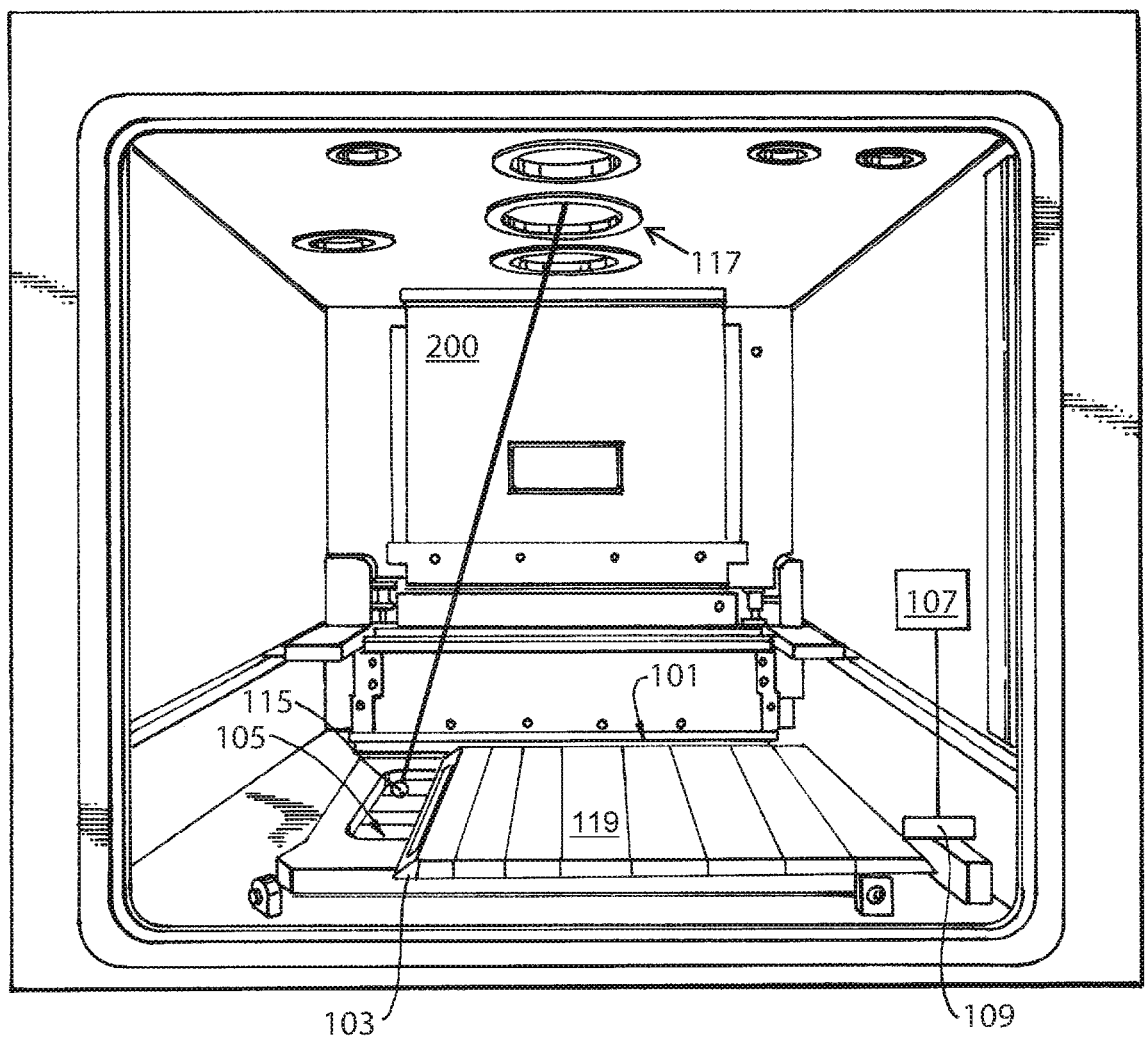
FIG. 3 is a perspective view of the sweep gas system of FIG. 1 disposed in an additive manufacturing machine in accordance with this disclosure, shown the gas manifold in the retracted state.

Reference will now be made to the drawings wherein like reference numerals identify similar structural features or aspects of the subject disclosure. For purposes of explanation and illustration, and not limitation, an illustrative view of an embodiment of a sweep gas system in accordance with the disclosure is shown in FIG. 1 and is designated generally by reference character 100. Other embodiments and/or aspects of this disclosure are shown in FIGS. 2 and 3. Certain embodiments described herein can be used to more efficiently and effectively remove, e.g., condensate during an additive manufacturing process.

Referring to FIGS. 1-3, a sweep gas system 100 for an additive manufacturing machine 200 (e.g., a laser powder bed fusion machine) can include a gas manifold 101 having an outlet 103 configured to effuse gas into a build area 105 of the additive manufacturing machine 200. The gas manifold 101 can be moveable across at least a portion of the build area 105.

The sweep gas system 100 can include a controller 107 configured to control a position of the gas manifold 101. For example, the controller 107 can be configured to control one or more actuators 109 to extend the outlet 103 over the build area 105. For example, the actuator can include at least one telescoping rod 111 (e.g., two or more disposed on opposite lateral sides outside or inside the manifold 101) connected to the outlet 103 and to a motor 113 to extend an hold the outlet 103 above the build area 105. Any suitable actuator mechanisms are contemplated herein (e.g., one or more screw motors).

The controller 107 can include any suitable hardware and/or software configured to perform the disclosed function. For example, the controller 107 can include a microprocessor, a memory, and any other suitable computer components. The controller 107 can include any suitable module(s) to extend and retract the gas manifold 101 in any suitable manner and according to any suitable logic.

In certain embodiments, the controller 107 can be configured to position the outlet 103 of the gas manifold 101 relative to a laser spot position and/or a melt pool location 115 a predetermined distance (e.g., a fixed or variable distance) from the laser spot position and/or melt pool 115. The controller 107 can be configured to maintain the predetermined distance from the laser spot position and/or melt pool 115 as a laser 117 scans over the build area 105 such that the sweep gas manifold 101 moves to follow the laser spot position and/or melt pool location 115.

In certain embodiments, the controller 107 can be configured to determine the predetermined distance in real time as a function of a laser power, a scan speed, a melt pool size, and/or a sweep gas pressure. For example, the controller 107 can be operatively connected to an additive manufacturing control module to receive one or more process characteristics from the additive manufacturing control module to control the position of the manifold 101 as a function thereof. It is contemplated that the controller 101 can be at least partially (e.g., completely) hosted commonly with the additive manufacturing control module of the additive manufacturing machine (e.g., as a software module of the additive manufacturing machine control system).

In certain embodiments, the controller 107 can be configured to control a flow of sweep gas (e.g., air) from a gas supply (e.g., a pressurized air source, a compressor, etc.), e.g., via one or more valves (not shown). Any other suitable functions for the controller 107 are contemplated herein. Any suitable sweep gas is contemplated herein (e.g., air or an inert gas).

The gas manifold 101 can include a bellows 119 connected to the outlet 103 to allow the outlet 103 to move relative to the build area 105 while maintaining a sealed sweep gas path. Any other suitable structures for allowing extension and contraction of the gas manifold 101 are contemplated herein.

The outlet 103 can include a width at least as wide as a build area 105 width of the build area 105 (e.g., along a direction into the page as shown in FIG. 1). The can provide a sheet of sweep gas flow over the whole build area 105 for example.

In certain embodiments, the outlet 103 can be angled (e.g., as shown best in FIG. 1) and configured to effuse gas at a non-right angle relative to a plane defined by the build area 105. The angled outlet 103 can be angled upward to effuse flow upward away from the build area 105, e.g., as shown in FIG. 1. In certain embodiments, the outlet 103 can effuse flow horizontal to the build area 105. Any suitable angle (e.g., 20 degrees, 45 degrees) is contemplated herein. Any other suitable manifold shape for any other suitable airflow is contemplated.

In accordance with at least one aspect of this disclosure, a method of using a sweep gas system of an additive manufacturing machine can include moving a gas manifold, e.g., as described above, across at least a portion of a build area of an additive manufacturing machine. The method can include effusing gas from an outlet of the gas manifold into the build area. Moving the gas manifold can include positioning the outlet of the gas manifold relative to a laser spot position and/or a melt pool location a predetermined distance from the laser spot position and/or melt pool. Moving the gas manifold can include maintaining the predetermined distance from the laser spot position and/or melt pool as a laser scans over the build area to follow the laser spot position and/or melt pool.

The method can include determining the predetermined distance in real time as a function of a laser power, a scan speed, a melt pool size, and/or a sweep gas pressure. Moving the gas manifold can include extending and/or contracting a bellows connected to the outlet to allow the outlet to move relative to the build area while maintaining a sealed sweep gas path. The method can include effusing gas from the outlet at a non-right angle relative to a plane defined by the build area.

In accordance with at least one aspect of this disclosure, an additive manufacturing machine, e.g., 200 can include a build area 105, an energy applicator (e.g., a laser 117 as shown) configured to melt powder 121 in the build area 105. The additive manufacturing machine, e.g., 200 can include a sweep gas system as disclosed herein, e.g., 100 as described above. Any other suitable components (e.g., a recoater) are contemplated herein.

Embodiments include a sweep gas knife that can move with a scanning laser. Certain embodiments can keep a relatively consistent distance (e.g., a couple inches) between manifold and melt pool. Embodiments can include a flexible bellows that can extend in and out and maintain connection with the gas source.

In certain embodiments, the control logic of the additive manufacturing machine knows where the melt pool is so that the control logic of the controller 107 can reference this melt pool location from the laser control logic, for example. The controller 107 can set position to optimal distance from melt pool location.

Fixed systems need to have parallel gas flow to get flow to the other side, however, embodiments allow other gas flow directions that may be more optimal (e.g., angled up from the powder bed). Therefore, certain embodiments can include and upwardly angled manifold that is more efficient.

As shown in FIG. 2, the gas manifold can be fully retracted when the laser scanner is closest to the incoming gas flow. As shown in FIG. 3, the gas manifold can be fully extended (e.g., extending over a majority and/or almost to the other side of the build area) when the laser scanning is farthest.

Certain embodiments provide an air knife that moves across the plate that can allow for a consistent and optimized gas flow to take place across the entire build platform. Embodiments of the air knife can extend to the far side of the build plate and gradually retract as the laser scans to the gas flow inlet side of the additive manufacturing machines. Certain embodiments can be retrofit into existing machines having an air knife, for example. Embodiments can direct the smoke, condensate, and particulate (collectively referred to as condensate) at a more optimal local angle that wouldn't be possible for a full build plate with existing fixed systems.

Soot and smoke is generated in the additive manufacturing process so inert gas is used to sweep that out of the path of the laser. Many systems have an air knife very close to the platform floor but this is becoming more problematic as platforms are increasing in size. Soot either isn't blown off the plate or the gas flow is turned up so high that it begins to blow powder away. The flow over these large areas also has flow variations, dead spots, turbulence, etc. which leads to instability. Embodiments can extend out such that the sweep gas outlet is much closer to the active melt pool. As the process moves from one side of the plate to the other, embodiments can gradually retract to stay out of the way of the laser, for example. Embodiments can provide consistent gas flow at the melt pool because the gas outlet can always be a consistent distance from the melt pool. Using certain embodiments will lead to less soot and smoke landing on the build area or obstructing the laser.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A sweep gas system for an additive manufacturing machine, comprising:
   a gas manifold having an outlet configured to effuse gas into a build area of the additive manufacturing machine, wherein the gas manifold is moveable across at least a portion of the build area, wherein the sweep gas system includes a controller configured to control a position of the gas manifold, wherein the controller is configured to position the outlet of the gas manifold relative to a laser spot position and/or a melt pool location a predetermined distance from the laser spot position and/or melt pool, wherein the controller is configured to maintain the predetermined distance from the laser spot position and/or melt pool as a laser scans over the build area such that the sweep gas manifold moves to follow the laser spot position and/or melt pool, wherein the controller is configured to determine the predetermined distance in real time as a function of a laser power, a scan speed, a melt pool size, and/or a sweep gas pressure.

2. The system of claim 1, wherein the gas manifold includes a bellows connected to the outlet to allow the outlet to move relative to the build area while maintaining a sealed sweep gas path.

3. The system of claim 2, wherein the outlet includes a width at least as wide as a build area width of the build area.

4. The system of claim 1, wherein the outlet is angled and configured to effuse gas at a non-right angle relative to a plane defined by the build area.

5. The system of claim 3, wherein the angled outlet is angled upward to effuse flow upward away from the build area.

6. A method of using a sweep gas system of an additive manufacturing machine, comprising:
   moving a gas manifold across at least a portion of a build area of an additive manufacturing machine;
   effusing gas from an outlet of the gas manifold into the build area, wherein moving the gas manifold includes positioning the outlet of the gas manifold relative to a laser spot position and/or a melt pool location a predetermined distance from the laser spot position and/or melt pool, wherein moving the gas manifold includes maintaining the predetermined distance from the laser spot position and/or melt pool as a laser scans over the build area to follow the laser spot position and/or melt pool; and
   determining the predetermined distance in real time as a function of a laser power, a scan speed, a melt pool size, and/or a sweep gas pressure.

7. The method of claim 6, wherein moving the gas manifold includes extending and/or contracting a bellows connected to the outlet to allow the outlet to move relative to the build area while maintaining a sealed sweep gas path.

8. The method of claim 6, further comprising effusing gas from the outlet at a non-right angle relative to a plane defined by the build area.

9. An additive manufacturing machine, comprising:
   a build area;
   an energy applicator configured to melt powder in the build area; and
   a sweep gas system, comprising:
      a gas manifold having an outlet configured to effuse gas into the build area of the additive manufacturing machine, wherein the gas manifold is moveable across at least a portion of the build area; and
      a controller configured to control a position of the gas manifold, wherein the controller is configured to position the outlet of the gas manifold relative to a laser spot position and/or a melt pool location a predetermined distance from the laser spot position and/or melt pool, wherein the controller is configured to maintain the predetermined distance from the laser spot position and/or melt pool as a laser scans over the build area such that the sweep gas manifold moves to follow the laser spot position and/or melt pool, wherein the controller is configured to determine the predetermined distance in real time as a function of a laser power, a scan speed, a melt pool size, and/or a sweep gas pressure.

* * * * *